(12) United States Patent
Ramachandiran et al.

(10) Patent No.: US 11,575,952 B2
(45) Date of Patent: Feb. 7, 2023

(54) DIGITAL RIGHTS MANAGEMENT WHILE STREAMING TO DISPLAY ARRAY

(71) Applicant: ARRIS Enterprises LLC, Suwanee, GA (US)

(72) Inventors: Kanakendiran Ramachandiran, Karnataka (IN); Vinod Jatti, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/569,828

(22) Filed: Jan. 6, 2022

(65) Prior Publication Data

US 2022/0329890 A1     Oct. 13, 2022

Related U.S. Application Data

(60) Provisional application No. 63/173,628, filed on Apr. 12, 2021.

(51) Int. Cl.

| | |
|---|---|
| *H04N 21/254* | (2011.01) |
| *G06F 3/14* | (2006.01) |
| *H04N 21/4363* | (2011.01) |
| *H04N 21/6587* | (2011.01) |
| *H04N 21/2347* | (2011.01) |
| *H04N 21/41* | (2011.01) |

(52) U.S. Cl.
CPC ....... *H04N 21/2541* (2013.01); *G06F 3/1446* (2013.01); *H04N 21/2347* (2013.01); *H04N 21/4122* (2013.01); *H04N 21/4363* (2013.01); *H04N 21/6587* (2013.01)

(58) Field of Classification Search
CPC .......... H04N 21/2347; H04N 21/2541; H04N 21/4122; H04N 21/4363; H04N 21/6587; G06F 3/1446
See application file for complete search history.

(56) References Cited

U.S. PATENT DOCUMENTS

| | | | | |
|---|---|---|---|---|
| 4,750,053 A | * | 6/1988 | Allen | ...... H04H 60/27 386/253 |
| 6,914,637 B1 | * | 7/2005 | Wolf | ...... H04N 19/89 348/476 |
| 7,131,004 B1 | * | 10/2006 | Lyle | ...... H04L 9/12 713/169 |

(Continued)

*Primary Examiner* — Michael B. Pierorazio
(74) *Attorney, Agent, or Firm* — Wenderoth, Lind & Ponack, L.L.P.

(57) ABSTRACT

Aspects of the present disclosure are drawn to a digital rights management (DRM) server device for use with a stream of encoded audio/video data and an n×m array of client devices, n being a first positive integer, m being a second positive integer. Each client device being configured to display a respective display content, at least one of the n×m array of client devices being configured to play audio content. The DRM server device includes a memory and a processor configured to execute instructions stored on the memory. This causes the DRM server device to register the n×m array of client devices, establish digital rights for the registered n×m array of client device, receive the stream of encoded audio/video data, and provide the stream of encoded audio/video data to the registered n×m array of client devices based on the established digital rights.

22 Claims, 5 Drawing Sheets

(56) References Cited

U.S. PATENT DOCUMENTS

| | | | |
|---|---|---|---|
| 7,179,980 B2* | 2/2007 | Kirkeby | H04H 60/27 |
| 7,242,766 B1* | 7/2007 | Lyle | H04L 9/3271 |
| | | | 380/2 |
| 7,499,462 B2* | 3/2009 | MacMullan | H04N 21/43615 |
| | | | 348/E5.103 |
| 8,479,236 B2* | 7/2013 | Tao | H04N 21/4363 |
| | | | 725/80 |
| 8,744,230 B2* | 6/2014 | Hovagim | H04N 21/8541 |
| | | | 386/200 |
| 10,356,387 B1* | 7/2019 | Phillips | H04N 5/23238 |
| 10,419,738 B1* | 9/2019 | Phillips | H04N 21/816 |
| 10,440,416 B1* | 10/2019 | Phillips | H04N 19/597 |
| 2005/0066356 A1* | 3/2005 | Stone | H04N 21/4367 |
| | | | 380/255 |
| 2006/0031889 A1* | 2/2006 | Bennett | H04N 21/41265 |
| | | | 348/E7.071 |
| 2007/0237332 A1* | 10/2007 | Lyle | H04L 63/0464 |
| | | | 380/263 |
| 2007/0274348 A1* | 11/2007 | Friedman | H04J 3/0697 |
| | | | 370/503 |
| 2008/0180518 A1* | 7/2008 | Miyazaki | H04N 21/4367 |
| | | | 375/E7.025 |
| 2008/0307496 A1* | 12/2008 | Kurose | H04N 21/43615 |
| | | | 726/2 |
| 2009/0040287 A1* | 2/2009 | Miyazaki | H04N 21/4367 |
| | | | 348/14.01 |
| 2010/0037253 A1* | 2/2010 | Sheehan | H04N 21/2668 |
| | | | 725/35 |
| 2010/0299264 A1* | 11/2010 | Berger | G06Q 30/0601 |
| | | | 705/59 |
| 2010/0322417 A1* | 12/2010 | Altmann | H04N 21/435 |
| | | | 380/42 |
| 2012/0180109 A1* | 7/2012 | Chen | H04N 21/4627 |
| | | | 726/3 |
| 2014/0237505 A1* | 8/2014 | Rothschild | H04N 21/23406 |
| | | | 725/112 |
| 2015/0271450 A1* | 9/2015 | van Coppenolle | |
| | | | H04N 21/23895 |
| | | | 725/31 |
| 2016/0034240 A1* | 2/2016 | Kreiner | G09F 9/3026 |
| | | | 348/383 |
| 2016/0112739 A1* | 4/2016 | Rothschild | H04N 21/23439 |
| | | | 725/92 |
| 2017/0013294 A1* | 1/2017 | Velasco | H04N 21/4367 |
| 2018/0373847 A1* | 12/2018 | Lo | H04N 21/4627 |
| 2019/0246149 A1* | 8/2019 | Reza | H04N 21/2347 |
| 2020/0037043 A1* | 1/2020 | Phillips | H04N 21/6587 |
| 2020/0107003 A1* | 4/2020 | Phillips | H04N 21/21805 |

* cited by examiner

DIGITAL RIGHTS MANAGEMENT WHILE STREAMING TO DISPLAY ARRAY

BACKGROUND

Embodiments of the invention relate to digital rights management while streaming to display array.

SUMMARY

Aspects of the present disclosure are drawn to a digital rights management (DRM) server device for use with a stream of encoded audio/video (A/V) data and an n×m array of client devices, n being a first positive integer, m being a second positive integer. Each client device being configured to display a respective display content, at least one of the n×m array of client devices being configured to play audio content. The DRM server device includes a memory and a processor configured to execute instructions stored on the memory. This causes the DRM server device to register the n×m array of client devices, establish digital rights for the registered n×m array of client device, receive the stream of encoded A/V data, and provide the stream of encoded A/V data to the registered n×m array of client devices based on the established digital rights.

In some embodiments, the processor is further configured to execute instructions stored on the memory to additionally cause the DRM server device to receive a trick play instruction from one of the registered n×m array of client devices and modify the stream of encoded A/V data to each of the registered n×m array of client devices based on the trick play instruction.

In some embodiments, the processor is further configured to execute instructions stored on the memory to additionally cause the DRM server device to determine a display level of each of the registered n×m array of client devices and provide the stream of encoded A/V data to the registered n×m array of client devices based on a lowest display level of the registered n×m array of client devices.

In some embodiments, the processor is further configured to execute instructions stored on the memory to additionally cause the DRM server device to maintain a uniform mechanism for license responses for the registered n×m array of client devices.

In some embodiments, the processor is further configured to execute instructions stored on the memory to additionally cause the DRM server device to encrypt the received stream of encoded A/V data and provide the stream of encoded A/V data to the registered n×m array of client devices as encrypted A/V data.

In some embodiments, the processor is further configured to execute instructions on the memory to additionally cause the DRM server device to determine whether a client device of the registered n×m array of client devices is at least one of unqualified to receive the stream of encoded A/V data or unable to process the stream of encoded A/V data. Additionally, the DRM server device may deny providing the stream of encoded A/V data to the registered n×m array of client devices when the client device of the registered n×m array of client devices is determined to be at least one of unqualified to receive the stream of encoded A/V data or unable to process the stream of encoded A/V data.

In some embodiments, the processor is further configured to execute instructions stored on the memory to additionally cause the DRM server device to provide a notification instruction to a client device of the registered n×m array of client devices that is qualified to receive the stream of encoded A/V data and is able to process the stream of encoded A/V data when the client device of the registered n×m array of client devices is determined to be at least one of unqualified to receive the stream of encoded A/V data or unable to process the stream of encoded A/V data.

Other aspects of the present disclosure are drawn to a method of using a DRM server device with a stream of encoded A/V data and an n×m array of client devices, n being a first positive integer, m being a second positive integer. Each client device being configured to display a respective display content, at least one of the n×m array of client devices being configured to play audio content. The method includes registering, via a processor configured to execute instructions stored on a memory, the n×m array of client devices and establishing, via the processor, digital rights for the registered n×m array of client devices. The method also includes receiving, via the processor, the stream of encoded A/V data and providing, via the processor, the stream of encoded A/V data to the registered n×m array of client devices based on the established digital rights.

In some embodiments, the method further includes receiving, via the processor, a trick play instruction from one of the registered n×m array of client devices and modifying, via the processor, the stream of encoded A/V data to each of the registered n×m array of client devices based on the trick play instruction.

In some embodiments, the method further includes determining, via the processor, a display level of each of the registered n×m array of client devices and providing, via the processor, the stream of encoded A/V data to the registered n×m array of client devices based on a lowest display level of the registered n×m array of client devices.

In some embodiments, the method further includes maintaining, via the processor, a uniform mechanism for license responses for the registered n×m array of client devices.

In some embodiments, the method further includes encrypting, via the processor, the received stream of encoded A/V data and providing, via the processor, the stream of encoded A/V data to the registered n×m array of client devices as encrypted A/V data.

In some embodiments, the method further includes determining, via the processor, whether a client device of the registered n×m array of client devices is at least one of unqualified to receive the stream of encoded A/V data or unable to process the stream of encoded A/V data. The method also includes denying, via the processor, providing the stream of encoded A/V data to the registered n×m array of client devices when the client device of the registered n×m array of client devices is determined to be at least one of unqualified to receive the stream of encoded A/V data or unable to process the stream of encoded A/V data.

In some embodiments, the method further includes comprising providing, via the processor, a notification instruction to a client device of the registered n×m array of client devices that is qualified to receive the stream of encoded A/V data and is able to process the stream of encoded A/V data when the client device of the registered n×m array of client devices is determined to be at least one of unqualified to receive the stream of encoded A/V data or unable to process the stream of encoded A/V data.

Other aspects of the present disclosure are drawn to a non-transitory, computer-readable media having computer-readable instructions stored thereon, the computer-readable instructions being capable of being read by a DRM server device for use with a stream of encoded A/V data and an n×m array of client devices, n being a first positive integer, m being a second positive integer, each client device being configured to display a respective display content, at least one of the n×m array of client devices being configured to play audio content, wherein the computer-readable instructions are capable of instructing the DRM server device to perform the method. The method includes registering, via a processor configured to execute instructions stored on a memory, the n×m array of client devices and establishing, via the processor, digital rights for the registered n×m array of client devices. The method also including receiving, via the processor, the stream of encoded A/V data and providing, via the processor, the stream of encoded A/V data to the registered n×m array of client devices based on the established digital rights.

In some embodiments, the method further includes receiving, via the processor, a trick play instruction from one of the registered n×m array of client devices and modifying, via the processor, the stream of encoded A/V data to each of the registered n×m array of client devices based on the trick play instruction.

In some embodiments, the method further includes determining, via the processor, a display level of each of the registered n×m array of client devices and providing, via the processor, the stream of encoded A/V data to the registered n×m array of client devices based on a lowest display level of the registered n×m array of client devices.

In some embodiments, the method further includes maintaining, via the processor, a uniform mechanism for license responses for the registered n×m array of client devices.

In some embodiments, the method further includes encrypting, via the processor, the received stream of encoded A/V data and providing, via the processor, the stream of encoded A/V data to the registered n×m array of client devices as encrypted A/V data.

In some embodiments, the method further includes determining, via the processor, whether a client device of the registered n×m array of client devices is at least one of unqualified to receive the stream of encoded A/V data or unable to process the stream of encoded A/V data and denying, via the processor, providing the stream of encoded A/V data to the registered n×m array of client devices when the client device of the registered n×m array of client devices is determined to be at least one of unqualified to receive the stream of encoded A/V data or unable to process the stream of encoded A/V data.

In some embodiments, the method further includes providing, via the processor, a notification instruction to a client device of the registered n×m array of client devices that is qualified to receive the stream of encoded A/V data and is able to process the stream of encoded A/V data when the client device of the registered n×m array of client devices is determined to be at least one of unqualified to receive the stream of encoded A/V data or unable to process the stream of encoded A/V data.

Other aspects of the present disclosure are drawn to a main client device for use with a DRM server device and a plurality of client devices. The client device being configured with the plurality of client devices as an n×m array of client devices, n being a first positive integer, m being a second positive integer. The main client device and each of the plurality of client devices being configured to display a respective display content, at least the main client device and each of the plurality client devices being configured to play audio content. The DRM server being configured to register the main client device and each of the plurality of client devices, establish digital rights for the registered the main client device and each of the plurality of client devices, receive the stream of encoded A/V data, provide the stream of encoded A/V data to the main client device based on the established digital rights. The main client device including a memory and a processor configured to execute instructions stored on said memory to cause said main client device to register with the DRM server and negotiate digital rights with the DRM server. The client device may also receive the stream of encoded A/V data in accordance with the negotiated digital rights, decode the A/V data to gain access to decoded video data and decoded audio data, and determine the configuration of the n×m array of client devices. The client device may further separate the decoded video data into n times m distinct video data payloads, encode n times m converted streams of encoded A/V data, each converted stream including a respective one of the n times m distinct video data payloads, and transmit (n×m)−1 encoded converted streams to the plurality of client devices, respectively, based on the determined configuration of the n×m array of client devices and based on the negotiated digital rights.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1:
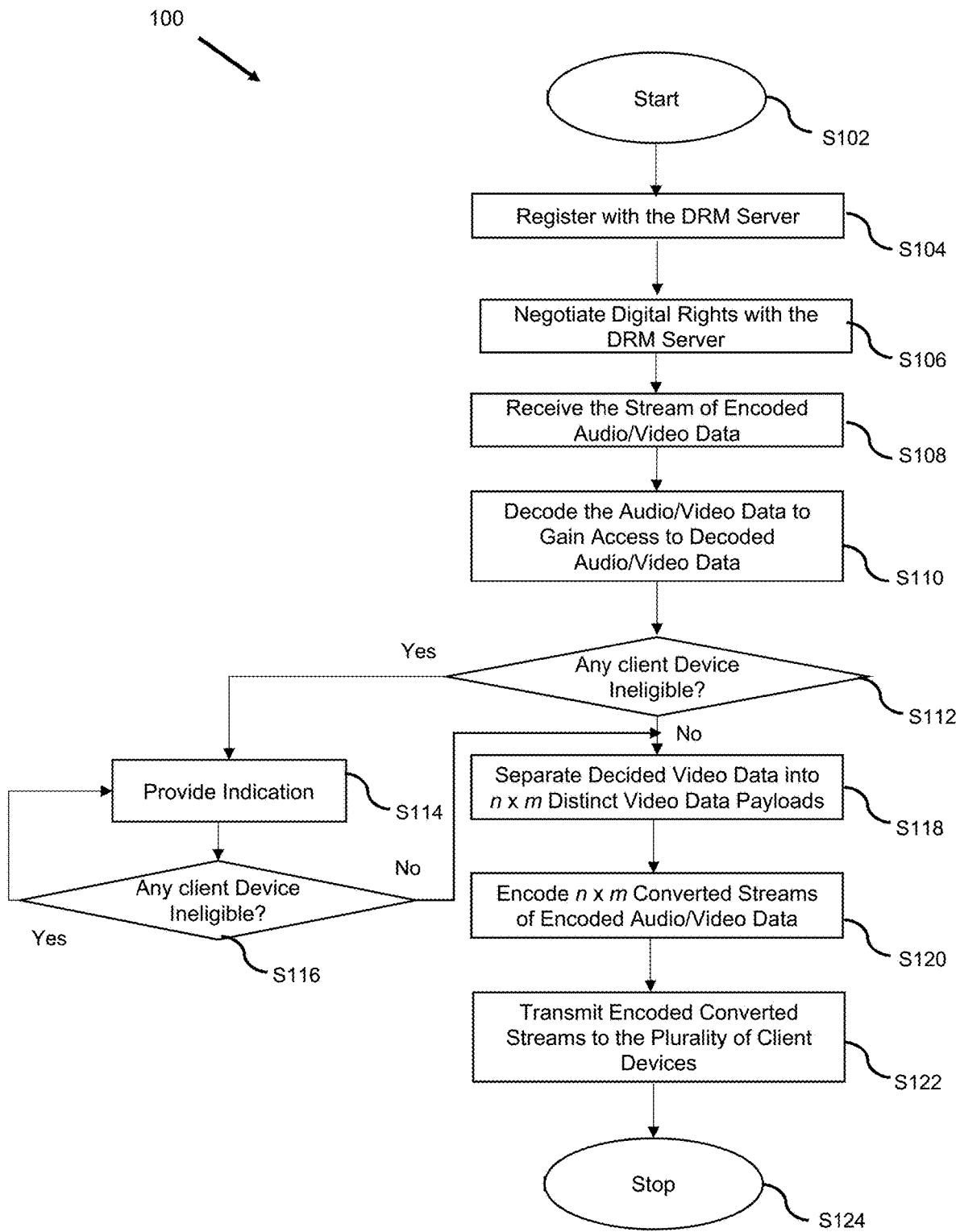
FIG. 1 illustrates an algorithm to be executed by a processor for DRM while streaming to display array in accordance with aspects of the present disclosure.

Conventionally, a server may identify that multiple client devices are located at a single location and may prompt the user to switch to 'video grid' mode of presentation. The server then breaks the received video streams into multiple segments and streams them to the individual client devices. However, there are problems involving DRM aspects while streaming to grid/group of display clients.

What is needed is a system and method for efficient DRM for an array of client devices.

A system and method in accordance with the present disclosure enables DRM for an array of client devices efficiently.

In accordance with the present disclosure, a display array is provided A/V data via a DRM server which provides the stream of A/V data to the display array based on the established digital rights.

When the content playback either starts or stops on one device, then all of the DRM sessions associated with the display array are simultaneously closed or opened. This provides the feel of a unitary client device with a multitude of client devices.

If a single display array is not satisfying the expected robustness level, then the entire display array will show lower quality video content. The user will also be notified with a pop-up message to upgrade the display unit so the user can eventually replace the display element with higher security for robust display to view the best quality video.

The DRM aspect of license response, renewal, and request is given to all client devices within the display array. When all client devices request for license, the DRM server will attempt to maintain a uniform mechanism for license responses. For example, a common key rotation mechanism may be used for encryption format, and unless any of the display devices are under negotiation relating to varying capabilities among display devices, then the mechanism may be uniform. This could be due to display devices being from different vendors that are grouped together. Some options of license response or renewal include: a license server can send individual license responses for each display unit or the license server can send a common response to all devices at once using a 'key-ring' mechanism', in which each display unit of a display array are part of the key-ring. The license server then generates a common unified 'DRM output policy' to group the formation of the display units.

The DRM server also handles service denial as well as smart user notification. When any of the display units is found to be blacklisted (ex: HDMI blacklisted), then the entire display array is denied the service. Smart user notifications are displayed on the client device indicating to replace the blacklisted display unit or about a faulty display unit.

One advantage of this approach is the cost effectiveness of having an in-home theater while still protecting digital rights. Large size TV's are very expensive and a client may benefit from purchasing a group of small size TV's and arranging them as an array rather than purchasing one large TV.

An example system and method for DRM for an array of client devices in accordance with aspects of the present disclosure will now be described in greater detail with reference to FIGS. 1-4.

Consider, for the purposes of explanation only, a situation where a client is attempting to stream media from an over the top (OTP) provider to an array of client devices in order to collectively present the same stream.

FIG. 1 illustrates an algorithm 100 to be executed by a processor for DRM while streaming to display array in accordance with aspects of the present disclosure.

As shown in the figure, algorithm 100 starts (S102), and an array of client devices is registered with the DRM server (S104). This procedure will be described with reference to FIGS. 2A-B and may be performed by any known method, a non-limiting example of which is that which is described in U.S. application Ser. No. 63/064,186, having a filing date of Aug. 11, 2020, the entire disclosure of which is incorporated herein by reference.

Figure 2A:
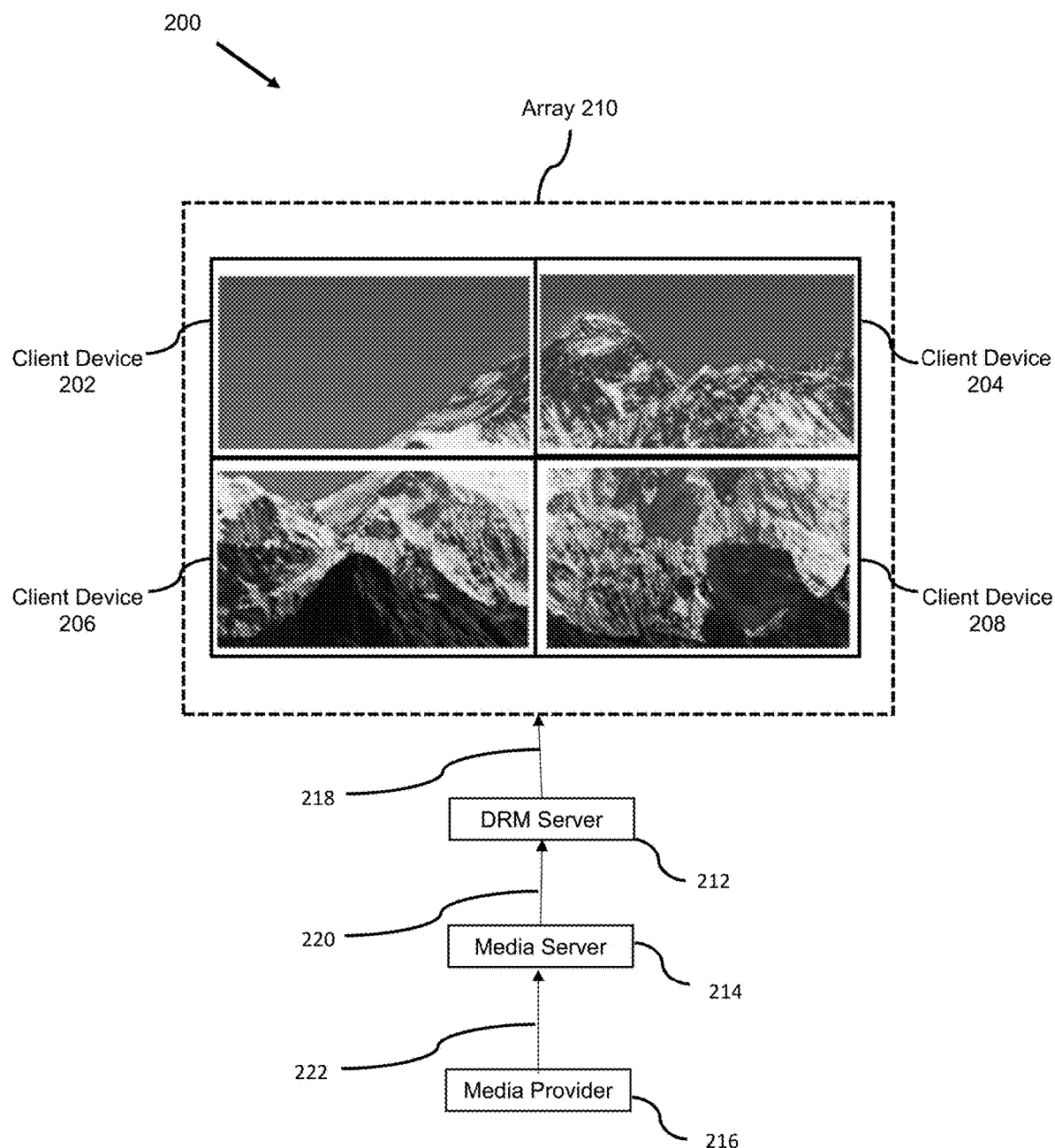
FIG. 2A illustrates a display system at a time $t_0$.

FIG. 2A illustrates a first embodiment of a display system 200 at a time $t_0$, wherein a DRM server 212 determines that a plurality of client devices are an array of client devices as described in U.S. application Ser. No. 63/064,186.

As shown in the figure, display system 200 includes a client device 202, a client device 204, a client device 206, a client device 208, an array 210, a DRM server 212, a media server 214, a media provider 216, a communication channel 218, a communication channel 220, and a communication channel 222.

Media provider 216 is configured to communicate with media server 214 via communication channel 222. Media server 214 is configured to communicate with DRM server 212 via communication channel 220. DRM server 212 is configured to communicate with array 210 via communication channel 218.

Figure 2B:
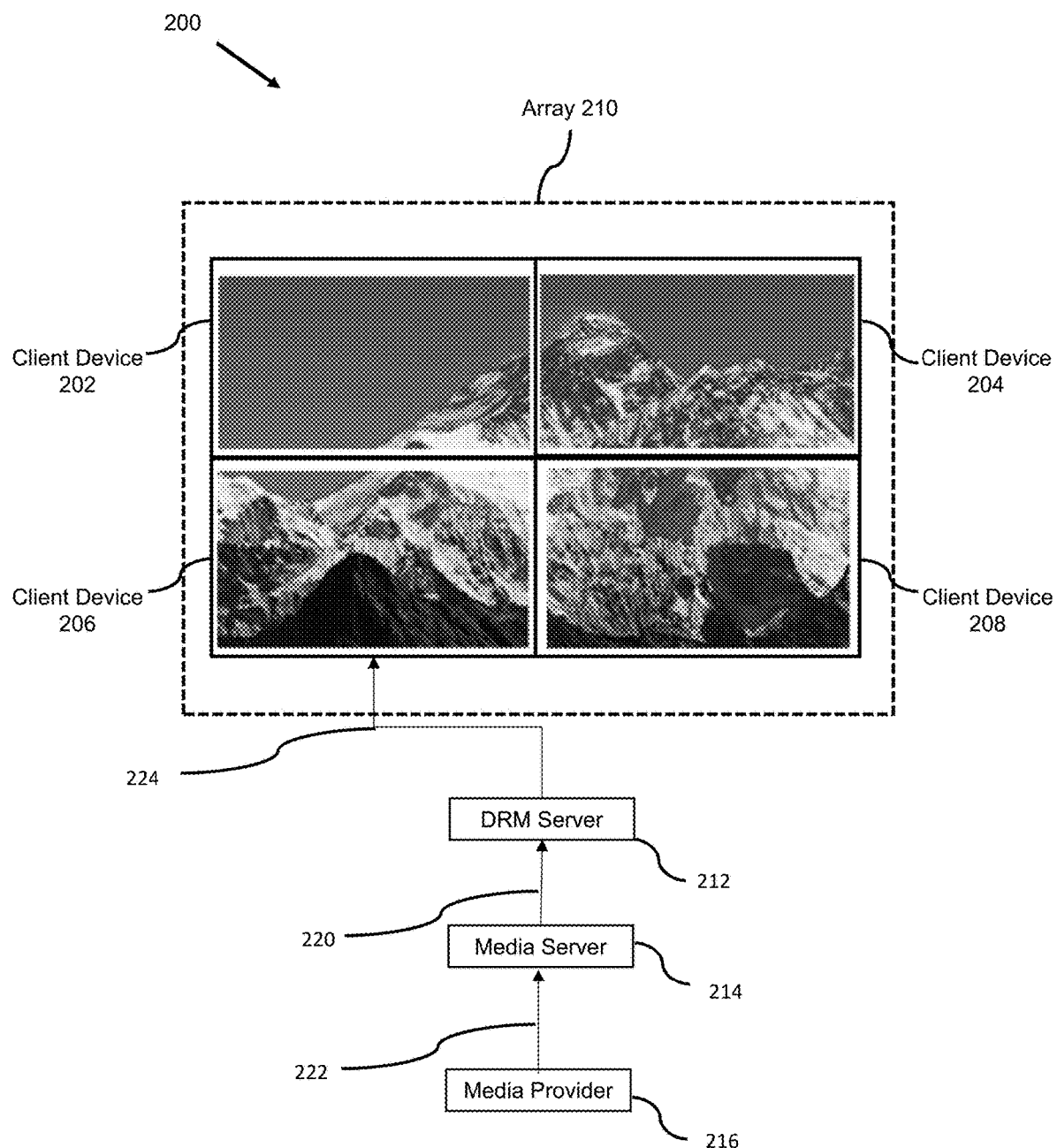
FIG. 2B illustrates a display system at a time $t_1$.

FIG. 2B illustrates an alternate embodiment of display system 200 at a time $t_1$, wherein client device 206 is a main client device and is configured to determine array 210 and communicate the information to DRM server 212 as described in U.S. application Ser. No. 63/064,186.

As shown in the figure, display system 200 includes client device 202, client device 204, client device 206, client device 208, array 210, DRM server 212, media server 214, media provider 216, communication channel 220, communication channel 222, and a communication channel 224.

Media provider 216 is configured to communicate with media server 214 via communication channel 222. Media server 214 is configured to communicate with DRM server 212 via communication channel 220. DRM server 212 is configured to communicate with client device 206 via communication channel 224.

Figure 3:
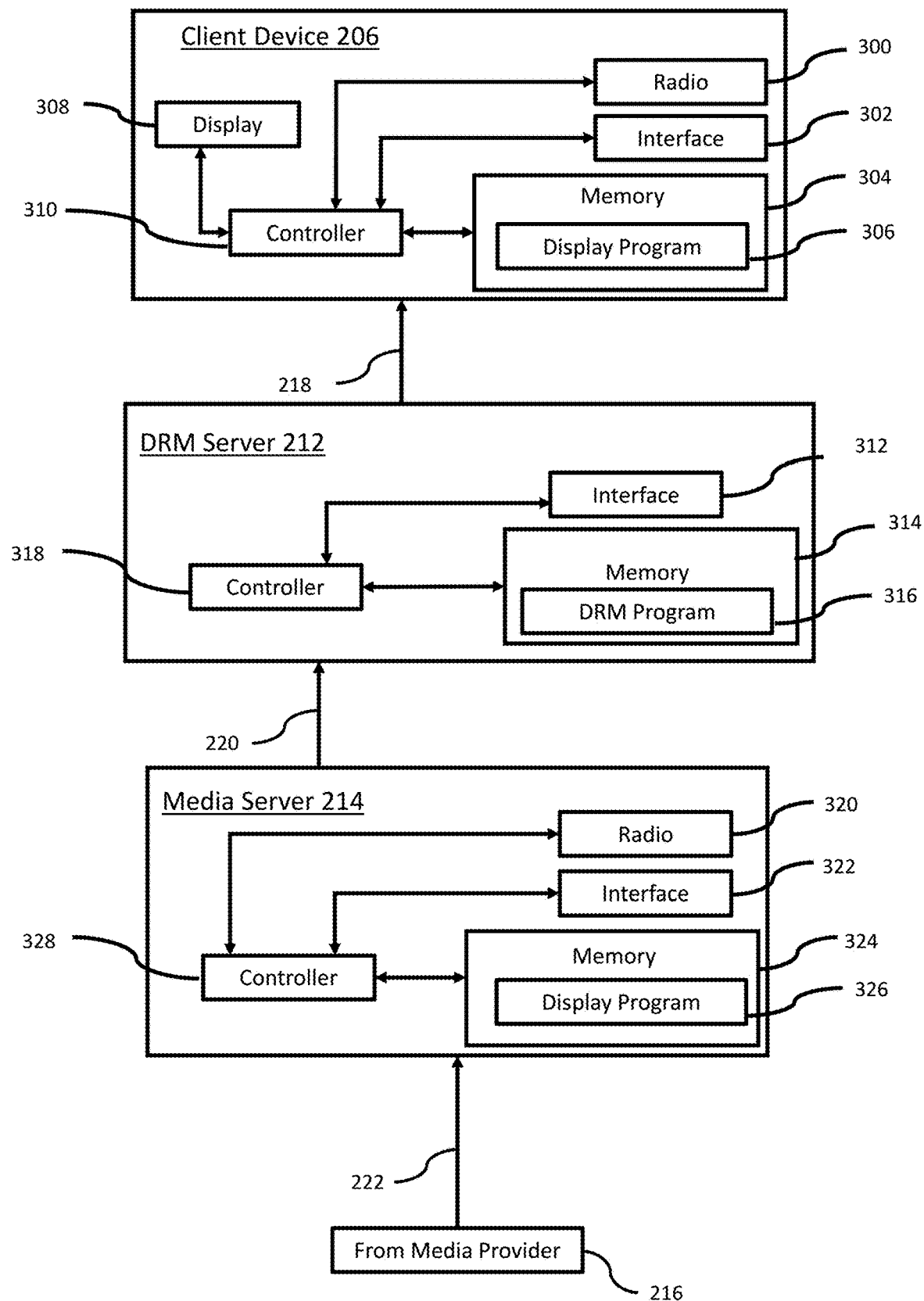
FIG. 3 illustrates an exploded view of the client device, DRM server, and media server of FIGS. 2A-B.

FIG. 3 illustrates an exploded view of client device 206, DRM server 212, and media server 214 of FIGS. 2A-B.

As shown in FIG. 3, DRM server 212 includes: a controller 318; a memory 314, which has stored therein a DRM program 316; and an interface 312.

In this example, controller 318, memory 314, and interface 312 are illustrated as individual devices. However, in some embodiments, at least two of controller 318, memory 314, and interface 312 may be combined as a unitary device. Further, in some embodiments, at least one of controller 318 and memory 314 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 318, may be any device capable of controlling general operations of DRM server 212 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of DRM server 212.

Memory 314 can store various programming, and user content, and data including DRM program 316. In some embodiments, as will be described in greater detail below, DRM program 316 includes instructions, that when executed by controller 318, enable DRM server 212 to: register the n×m array of client devices, establish digital rights for the registered n×m array of client devices; receive the stream of encoded A/V data; and provide the stream of encoded A/V data to the registered n×m array of client devices based on the established digital rights.

Interface 312 can include one or more connectors, such as RF connectors, or Ethernet connectors, and/or wireless communication circuitry, such as 5G circuitry and one or more antennas. Interface circuit 312 receives content from media server 214 and provides the content to client device 206 by known methods, non-limiting examples of which include terrestrial antenna, satellite dish wired cable, DSL, optical fibers, or 5G as discussed above.

In some embodiments, as will be described in greater detail below, DRM program 316 includes instructions, that when executed by controller 318, enable DRM server 212 to additionally receive a trick play instruction from one of the registered n×m array of client devices and modify the stream of encoded A/V data to each of the registered n×m array of client devices based on the trick play instruction. In some embodiments, DRM program 316 includes instructions, that when executed by controller 318, enable DRM server 212 to consider the registered n×m array of client devices as a single instance of video playback. For example, DRM server 212 may include a single entry, or account, for the registered n×m array of client devices, even though the registered n×m array of client devices are actually multiple users.

In some embodiments, as will be described in greater detail below, DRM program 316 includes instructions, that when executed by controller 318, enable DRM server 212 to additionally cause DRM server 212 to determine a display level and DRM robustness level of each of the registered n×m array of client devices. For example, as the DRM robustness level increases, the client device will be authorized to view higher video quality. In some embodiments, as will be described in greater detail below, DRM program 316 includes instructions, that when executed by controller 318, enable DRM server 212 to additionally cause DRM server 212 to determine the DRM robustness level and display level of the registered n×m array of client devices based on an aggregate of the lowest level among each of the client devices and provide the stream of encoded A/V data to the registered n×m array of client devices based on a lowest display level and lowest DRM robustness level of the registered n×m array of client devices.

In some embodiments, as will be described in greater detail below, DRM program 316 includes instructions, that when executed by controller 318, enable DRM server 212 to: maintain a uniform mechanism for license responses or license renewal for the registered n×m array of client devices; send a respective individual response to each client device within the registered n×m array of client devices, or a common response to all client devices within the registered n×m array of client devices. In some embodiments, a client device of the registered n×m array of client devices may use a custom field in a license request for communicating an additional configuration to DRM server 212.

In some embodiments, as will be described in greater detail below, DRM program 316 includes instructions, that when executed by controller 318, enable DRM server 212 to encrypt the received stream of encoded A/V data and provide the stream of encoded A/V data to the registered n×m array of client devices as encrypted A/V data.

In some embodiments, as will be described in greater detail below, DRM program 316 includes instructions, that when executed by controller 318, enable DRM server 212 to determine whether a client device of the registered n×m array of client devices is at least one of unqualified to receive the stream of encoded A/V data or unable to process the stream of encoded A/V data and deny providing the stream of encoded A/V data to the registered n×m array of client devices when the client device of the registered n×m array of client devices is determined to be at least one of unqualified to receive the stream of encoded A/V data or unable to process the stream of encoded A/V data.

In some embodiments, as will be described in greater detail below, DRM program 316 includes instructions, that when executed by controller 318, enable DRM server 212 to provide a notification instruction to a client device of the registered n×m array of client devices that is qualified to receive the stream of encoded A/V data and is able to process the stream of encoded A/V data when the client device of the registered n×m array of client devices is determined to be at least one of unqualified to receive the stream of encoded A/V data or unable to process the stream of encoded A/V data.

Client device 206 includes: a radio 300; an interface 302; a memory 304 which has stored therein a display program 306; a display 308; and a controller 310.

In this example, controller 310, memory 304, radio 300, and interface circuit 302 are illustrated as individual devices. However, in some embodiments, at least two of controller 310, memory 304, radio 300, and interface circuit 302 may be combined as a unitary device. Whether as individual devices or as combined devices, controller 310, memory 304, radio 300, and interface circuit 302 may be implemented as any combination of an apparatus, a system and an integrated circuit. Further, in some embodiments, at least one of controller 310, memory 304 and interface circuit 302 may be implemented as a computer having non-transitory computer-readable media for carrying or having computer-executable instructions or data structures stored thereon.

Controller 310 may be any device capable of controlling general operations of client device 206 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 206.

Memory 304 can store various programming, and user content, and data including display program 306. In some embodiments, as will be described in greater detail below, display program 306 includes instructions that, when executed by controller 310, enable controller 310 to register with DRM server 212; negotiate digital rights with DRM server 212; receive the stream of encoded A/V data in accordance with the negotiated digital rights; decode the A/V data to gain access to decoded video data and decoded audio data; determine the configuration of the n×m array of client devices; separate the decoded video data into n×m distinct video data payloads; encode n times m converted streams of encoded A/V data, each converted stream including a respective one of the n times m distinct video data payloads; and transmit (n×m)−1 encoded converted streams to the plurality of client devices, respectively, based on the determined configuration of the n×m array of client devices and based on the negotiated digital rights.

Interface circuit 302 can include one or more connectors, such as RF connectors, or Ethernet connectors, and/or wireless communication circuitry, such as 5G circuitry and one or more antennas. Interface circuit 302 receives content from DRM server 212 by known methods, non-limiting examples of which include terrestrial antenna, satellite dish, wired cable, DSL, optical fibers, or 5G as discussed above. Through interface circuit 302, DRM server 212 receives an input signal, including data and/or A/V content, from media server 214.

Radio 300, (and preferably two or more radios), may also be referred to as a wireless communication circuit, such as a Wi-Fi WLAN interface radio transceiver and is operable to communicate with DRM server 212, client device 202, client device 204, and client device 208. Radio 300 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 206 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Media server 214 includes a controller 328; a memory 324, which has stored therein a display program 326; and at least one radio, a sample of which is illustrated as radio 320; and an interface 322.

In this example, controller 328, memory 324, radio 320, and interface 322 are illustrated as individual devices. However, in some embodiments, at least two of controller 328, memory 324, radio 310, and interface 322 may be combined as a unitary device. Further, in some embodiments, at least one of controller 328 and memory 324 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controller 328, may be any device capable of controlling general operations of media server 214 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of media server 214.

Memory 324 can store various programming, and user content, and data including display program 326.

Interface circuit 322 can include one or more connectors, such as RF connectors, or Ethernet connectors, and/or wireless communication circuitry, such as 5G circuitry and one or more antennas. Interface circuit 322 receives content from media provider 216 and provides content to DRM server 212 by known methods, non-limiting examples of which include terrestrial antenna, satellite dish, wired cable, DSL, optical fibers, or 5G as discussed above.

Radio 320, may include a Wi-Fi WLAN interface radio transceiver that is operable to communicate with DRM server 212, as shown in the figure and also may include a cellular transceiver operable to communicate with the media provider through communication channel 220. Radio 320 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Media server 214 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Returning to FIG. 1, after registering the DRM server (S104), digital rights are negotiated with the DRM server (S106). For example, with the situation previously mentioned, with reference to FIGS. 2A and 3, DRM server 212 establishes digital rights for array 210. DRM program 316 contains all licensing information for each client device, non-limiting examples of which include: the number of times a piece of content may be played; a number of times a piece of content may be copied; if and when a license may be renegotiated or renewed; a display level, e.g., supported high-definition standards; supported encoding schemes, e.g., MPEP; whether a license is part of a uniform license for the entire array; encryption level and/or type supported; and combinations thereof.

Returning to FIG. 1, after digital rights are negotiated with the DRM server (S106), the stream of encoded A/V data is received (S108). For example, with reference to FIG. 3, DRM server 212 would receive the stream of encoded A/V data from media server 214 via communication channel 220.

Returning to FIG. 1, after the stream of encoded A/V data is received (S108), the A/V data is decoded to gain access to the decoded video data and decoded audio data (S110). For example, with reference to FIG. 3, interface 312 of DRM server 212 will receive the encoded A/V data and controller 318 will decode the A/V data packets.

Returning to FIG. 1, after the A/V data is decoded to gain access to the decoded video data and decoded audio data (S110), it is determined whether any client devices are ineligible to receive the decoded video data and the decoded audio data (S112). For example, with reference to FIG. 3, controller 318 of DRM server 212 will access DRM program 316 to determine whether any of client device 202, client device 204, client device 206, and client device 208 within array 210 is ineligible to receive the decoded video data and the decoded audio data. A client device may be ineligible to receive the decoded video data and the decoded audio data for any one of multiple reasons. For example: a client device may have surpassed the number of times a piece of content may be played, as indicated in DRM program 318; a license of a client device may be expired, as indicated in DRM program 318; a display level of a client device, as indicated in DRM program 318, might not be sufficient for the decoded video data and the decoded audio data; an encoding scheme required for the decoded video data and the decoded audio data might not be supported by a client device, as indicated in DRM program 318; a license for a client device is part of a uniform license for the entire array, which is expired as indicated in DRM program 318; an encryption level and/or type is required for the decoded video data and the decoded audio data, but is not supported by the client device, as indicated in DRM program 318; and combinations thereof.

Returning to FIG. 1, if it is determined that any client device is ineligible to receive the content (Yes at S112), then an indication may be provided (S114). For example, as shown in FIG. 3, DRM server 212 may provide an indication that a client device is ineligible to receive the content.

In some embodiments, controller 318 of DRM server 212 will cause DRM server 212 to determine if a client device is unqualified to receive the stream of encoded A/V data or is unable to process the stream of A/V data. DRM server 212 will then deny providing the stream of encoded A/V data to array 210. An example embodiment will be discussed in greater detail with reference to FIG. 4.

Figure 4:
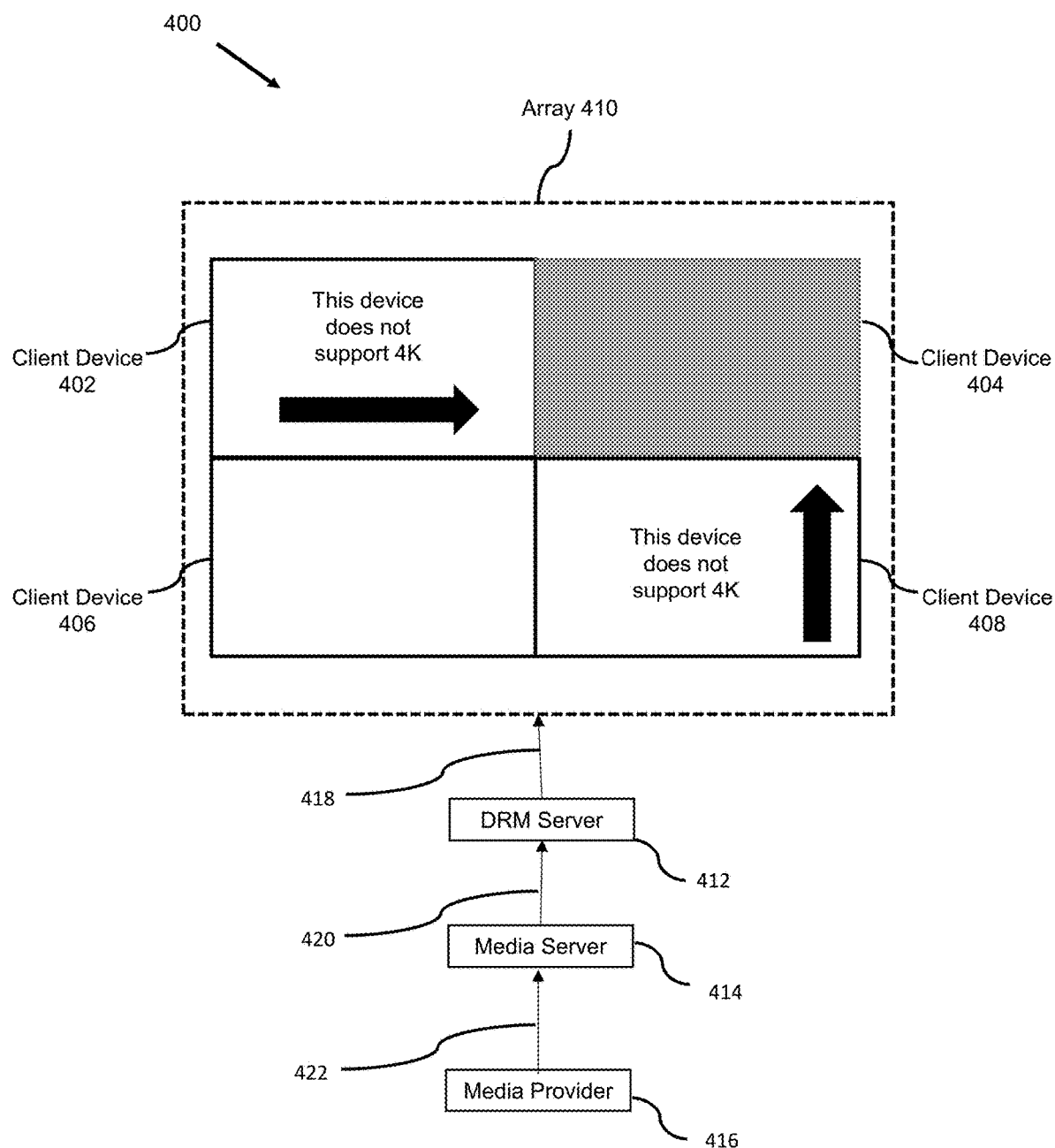
FIG. 4 illustrates a display system at a time $t_2$.

FIG. 4 illustrates a display system 400 at a time $t_2$.

As shown in the figure, display system 400 includes a client device 402, a client device 404, a client device 406, a client device 408, an array 410, a DRM server 412, a media server 414, a media provider 416, a communication channel 418, a communication channel 420, and a communication channel 422.

Media provider 416 is configured to communicate with media server 414 via communication channel 422. Media server 414 is configured to communicate with DRM server 412 via communication channel 420. DRM server 412 is configured to communicate with array 410 via communication channel 418.

With the situation previously mentioned, with additional reference to FIG. 3, DRM server 412 will provide a notification instruction to client device 402 as well as client device 408, which are qualified to receive the stream of encoded A/V data and are able to process the stream of encoded A/V data. This notification will inform the client that at least one of the client devices is unqualified to receive the stream, which in this case is client device 404. A non-limiting example of which is an arrow shown on both client device 402 and client device 408 pointing to the device that is unqualified to receive the stream. DRM program 316 contains a data structure, a non-limiting example of which includes a lookup table (LUT), listing a plurality of unsupported makes and models of client devices. DRM server 212 will check the LUT before providing a stream to determine if client device 404 is in that data structure. If client device 404 is included in that data structure, then it will not provide the A/V content to client device 404, but will instead provide a notification to client device 402 and client device 408 to display.

Returning to FIG. 1, after an indication is provided (S114), it is again determined whether any client devices are ineligible to receive the decoded video data and the decoded audio data (S118). This procedure may be performed in a manner similar to that discussed above (S112). If particular, this procedure may address situations where multiple client devices are ineligible to receive the decoded video data and the decoded audio data, or if the issue drawn to the original client device that was identified as being ineligible to receive the decoded video data and the decoded audio data was not rectified (after S114).

If it is determined that a client device is ineligible to receive the decoded video data and the decoded audio data (Yes at S118), then an indication is again provided (return to S114). However, if it is determined that no client device is ineligible to receive the decoded video data and the decoded audio data (No at S118 or No at S112), then, the decoded video data is separated into n×m distinct video data payloads (S118). In this example embodiment, 2×2, or four distinct video data payloads are separated.

Returning to FIG. 1, after the decoded video data is separated into n×m distinct video data payloads (S118), the n×m converted streams of encoded A/V data are encoded, each converted stream including a respective one of the n×m distinct video payloads (S120).

Returning to FIG. 1, after the n×m converted streams of encoded A/V data are encoded, each converted stream including a respective one of the n×m distinct video payloads (S120), the "(n×m)−1" encoded converted streams are transmitted to the plurality of client devices, respectively, based on the determined configuration of the n×m array of client devices and based on the negotiated digital rights (S122). For example, with reference to FIG. 3, DRM server 212 will transmit the converted stream to array 210 via communication channel 218.

In some embodiments, controller 318 of DRM server 212 will determine the display level of each of the client devices and provide the stream of encoded A/V data to array 210 based on the lowest display level of array 210.

Returning to FIG. 1, after the (n×m)−1 encoded converted streams are transmitted to the plurality of client devices, respectively, based on the determined configuration of the n×m array of client devices and based on the negotiated digital rights (S122), algorithm 100 stops (S124).

The non-limiting example algorithm 100 discussed above described the management of digital rights with respect to an array of client devices. However, in some embodiments, a DRM in accordance with aspects of the present disclosure may manage content to an array of client devices when one client device, of the array of client devices, executes a trick play on the provided content.

In some embodiments, DRM server 212 may receive a trick play instruction as received from client device 206. For example, for purposes of discussion, presume that client device 206 executes a trick play on the content, wherein a trick play may include a pause, a rewind, or a fast forward. In accordance with aspects of the present disclosure, DRM server 212 may then modify the stream of encoded A/V data to each client device within array 210 based on the trick play instruction as provided by client device 206.

Conventionally, a DRM server may identify that multiple client devices are located at a single location and may prompt the user to switch to 'video grid' mode of presentation. The server then breaks the received video streams into multiple segments and streams them to the individual client devices. However, there are problems involving DRM aspects while streaming to grid/group of display clients.

In accordance with the present disclosure, a display array is provided A/V data via a DRM server which provides the stream of A/V data to the display array based on the established digital rights. This enables DRM for an array of client devices efficiently. This system also allows for content playback to be associated with all devices in the display array in that DRM session. Additionally, this system provides consistent robustness level based on the lowest quality video of the client device within the display array. The user will be notified with a popup message that some client devices within the display array are not satisfying the robustness level of the display content. Also, when all client devices request for license, the DRM server will attempt to maintain a uniform mechanism for license response to generate a common 'DRM output policy' to group the formation of the display units. Lastly, the DRM server handles service denial and smart user notification regarding blacklisting display units.

One advantage of this approach is the cost effectiveness of having an in-home theater while still protecting digital rights. Large size TV's can be very expensive and a client may benefit from purchasing a set of smaller size TV's and arranging them in an array rather than purchasing one large TV. Another benefit is the consistent display resolution for the streamed A/V data to the display array.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A digital rights management server device for use with a stream of encoded audio/video data and an n×m array of client devices, the digital rights management server device comprising:
   a memory; and
   a processor configured to execute instructions stored on the memory to cause the digital rights management server device to:
      register the n×m array of client devices, wherein n being a first positive integer, m being a second positive integer, each client device being configured to display a respective display content, at least one of the n×m array of client devices being configured to play audio content;
      establish digital rights for the registered n×m array of client devices;
      receive the stream of encoded audio/video data;
      determine that a first client device of the registered n×m array of client devices is qualified to receive the stream of encoded audio/video data and is able to process the stream of encoded audio/video data;
      provide a notification instruction to the first client device that a second client device of the registered n×m array of client devices is at least one of unqualified to receive the stream of encoded audio/video data or unable to process the stream of encoded audio/video data;

determine that each client device of the registered n×m array of client devices is qualified to receive the stream of encoded audio/video data and is able to process the stream of encoded audio/video data; and after providing the notification instruction, provide the stream of encoded audio/video data to the registered n×m array of client devices based on the established digital rights and a determination that each client device of the registered n×m array of client devices is qualified to receive the stream of encoded audio/video data and is able to process the stream of encoded audio/video data.

2. The digital rights management server device of claim 1, wherein the processor is further configured to execute instructions stored on the memory to additionally cause the digital rights management server device to:

receive a trick play instruction from one of the registered n×m array of client devices; and modify the stream of encoded audio/video data to each of the registered n×m array of client devices based on the trick play instruction.

3. The digital rights management server device of claim 1, wherein the processor is further configured to execute instructions stored on the memory to additionally cause the digital rights management server device to:

determine a display level of each of the registered n×m array of client devices; and provide the stream of encoded audio/video data to the registered n×m array of client devices based on a lowest display level of the registered n×m array of client devices.

4. The digital rights management server device of claim 1, wherein the processor is further configured to execute instructions stored on the memory to additionally cause the digital rights management server device to maintain a uniform mechanism for license responses for the registered n×m array of client devices.

5. The digital rights management server device of claim 1, wherein providing the stream of encoded audio/video data comprises:

encrypting the received stream of encoded audio/video data; and providing the stream of encoded audio/video data to the registered n×m array of client devices as encrypted audio/video data.

6. The digital rights management server device of claim 1, wherein the processor is further configured to execute instructions stored on the memory to additionally cause the digital rights management server device to:

determine that the second client device of the registered n×m array of client devices is at least one of unqualified to receive the stream of encoded audio/video data or unable to process the stream of encoded audio/video data; and deny providing the stream of encoded audio/video data to the registered n×m array of client devices when the second client device of the registered n×m array of client devices is determined to be at least one of unqualified to receive the stream of encoded audio/video data or unable to process the stream of encoded audio/video data.

7. The digital rights management server device of claim 1, wherein providing the notification instructions comprises checking a lookup table (LUT) for the second client device, wherein the LUT lists a plurality of unsupported devices.

8. A method of providing a stream of encoded audio/video data to an n×m array of client devices, the method comprising:

registering the n×m array of client devices, wherein n being a first positive integer, m being a second positive integer, each client device being configured to display a respective display content, at least one of the n×m array of client devices being configured to play audio content;

establishing digital rights for the registered n×m array of client devices;

receiving the stream of encoded audio/video data;

determine that a first client device of the registered n×m array of client devices is qualified to receive the stream of encoded audio/video data and is able to process the stream of encoded audio/video data;

provide a notification instruction to the first client device that a second client device of the registered n×m array of client devices is at least one of unqualified to receive the stream of encoded audio/video data or unable to process the stream of encoded audio/video data;

determine that each client device of the registered n×m array of client devices is qualified to receive the stream of encoded audio/video data and is able to process the stream of encoded audio/video data; and after providing the notification instruction, providing the stream of encoded audio/video data to the registered n×m array of client devices based on the established digital rights and a determination that each client device of the registered n×m array of client devices is qualified to receive the stream of encoded audio/video data and is able to process the stream of encoded audio/video data.

9. The method of claim 8, further comprising:

receiving a trick play instruction from one of the registered n×m array of client devices; and modifying the stream of encoded audio/video data to each of the registered n×m array of client devices based on the trick play instruction.

10. The method of claim 8, further comprising:

determining a display level of each of the registered n×m array of client devices; and providing the stream of encoded audio/video data to the registered n×m array of client devices based on a lowest display level of the registered n×m array of client devices.

11. The method of claim 8, further comprising maintaining a uniform mechanism for license responses for the registered n×m array of client devices.

12. The method of claim 8, wherein providing the stream of encoded audio/video data comprises:

encrypting the received stream of encoded audio/video data; and providing the stream of encoded audio/video data to the registered n×m array of client devices as encrypted audio/video data.

13. The method of claim 8, further comprising:

determining that the second client device of the registered n×m array of client devices is at least one of unqualified to receive the stream of encoded audio/video data or unable to process the stream of encoded audio/video data; and denying providing the stream of encoded audio/video data to the registered n×m array of client devices when the second client device of the registered n×m array of client devices is determined to be at least one of unqualified to receive the stream of encoded audio/video data or unable to process the stream of encoded audio/video data.

14. The method of claim 8, wherein providing the notification instructions comprises checking a lookup table (LUT) for the second client device, wherein the LUT lists a plurality of unsupported devices.

15. A non-transitory, computer-readable media of a digital rights management server device for providing a stream of encoded audio/video data to an n×m array of client devices, wherein the computer-readable instructions when executed by a processor of the digital rights management server device cause the digital rights management server device to perform one or more operations comprising:
   registering the n×m array of client devices, wherein n being a first positive integer, m being a second positive integer, each client device being configured to display a respective display content, at least one of the n×m array of client devices being configured to play audio content;
   establishing digital rights for the registered n×m array of client devices;
   receiving the stream of encoded audio/video data;
      determining that a first client device of the registered n×m array of client devices is qualified to receive the stream of encoded audio/video data and is able to process the stream of encoded audio/video data;
      providing a notification instruction to the first client device that a second client device of the registered n×m array of client devices is at least one of unqualified to receive the stream of encoded audio/video data or unable to process the stream of encoded audio/video data;
      determining that each client device of the registered n×m array of client devices is qualified to receive the stream of encoded audio/video data and is able to process the stream of encoded audio/video data; and
      after providing the notification instruction, providing the stream of encoded audio/video data to the registered n×m array of client devices based on the established digital rights.

16. The non-transitory, computer-readable media of claim 15, wherein the computer-readable instructions when executed by the processor, further cause the digital rights management server device to perform one or more further operations comprising:
   receiving a trick play instruction from one of the registered n×m array of client devices; and
   modifying the stream of encoded audio/video data to each of the registered n×m array of client devices based on the trick play instruction.

17. The non-transitory, computer-readable media of claim 15, wherein the computer-readable instructions when executed by the processor, further cause the digital rights management server device to perform one or more further operations comprising:
   determining a display level of each of the registered n×m array of client devices; and
   providing the stream of encoded audio/video data to the registered n×m array of client devices based on a lowest display level of the registered n×m array of client devices.

18. The non-transitory, computer-readable media of claim 15, wherein the computer-readable instructions when executed by the processor, further cause the digital rights management server device to perform one or more further operations comprising maintaining a uniform mechanism for license responses for the registered n×m array of client devices.

19. The non-transitory, computer-readable media of claim 15, wherein the computer-readable instructions when executed by the processor, further cause the digital rights management server device to perform one or more further operations comprising:
   encrypting the received stream of encoded audio/video data; and
   providing the stream of encoded audio/video data to the registered n×m array of client devices as encrypted audio/video data.

20. The non-transitory, computer-readable media of claim 15, wherein the computer-readable instructions when executed by the processor, further cause the digital rights management server device to perform one or more further operations comprising:
   determining that the second client device of the registered n×m array of client devices is at least one of unqualified to receive the stream of encoded audio/video data or unable to process the stream of encoded audio/video data; and
   denying, via the processor, providing the stream of encoded audio/video data to the registered n×m array of client devices when the second client device of the registered n×m array of client devices is determined to be at least one of unqualified to receive the stream of encoded audio/video data or unable to process the stream of encoded audio/video data.

21. The non-transitory, computer-readable media of claim 15, wherein providing the notification instructions comprises checking a lookup table (LUT) for the second client device, wherein the LUT lists a plurality of unsupported devices.

22. A main client device for use with a digital rights management server device and a plurality of client devices, the main client device comprising:
   a memory; and
   a processor configured to execute instructions stored on the memory to cause the main client device to:
      register with the digital rights management server, wherein the main client device and the plurality of client device are configured as a configuration of an n×m array of client devices, the main client device and each of the plurality of client devices being configured to display a respective display content, at least one of the main client device and each of the plurality of client devices being configured to play audio content, and wherein n being a first positive integer, m being a second positive integer, at least one of the n×m array of client devices being configured to play audio content;
      negotiate digital rights with the digital rights management server device;
      receive a notification instruction from the digital rights management server device that at least one of the plurality of client devices is at least one of unqualified to receive a stream of encoded audio/video data or unable to process the stream of encoded audio/video data;
      after receiving the notification instruction, receive the stream of encoded audio/video data in accordance with the negotiated digital rights;
      decode the audio/video data to gain access to decoded video data and decoded audio data;

determine the configuration of the n×m array of client devices;
separate the decoded video data into n times m distinct video data payloads;
encode n times m converted streams of encoded audio/video data, each converted stream including a respective one of the n times m distinct video data payloads; and
transmit (n×m)−1 encoded converted streams to the plurality of client devices, respectively, based on the determined configuration of the n×m array of client devices and based on the negotiated digital rights.

\* \* \* \* \*